United States Patent Office 3,564,450
Patented Feb. 16, 1971

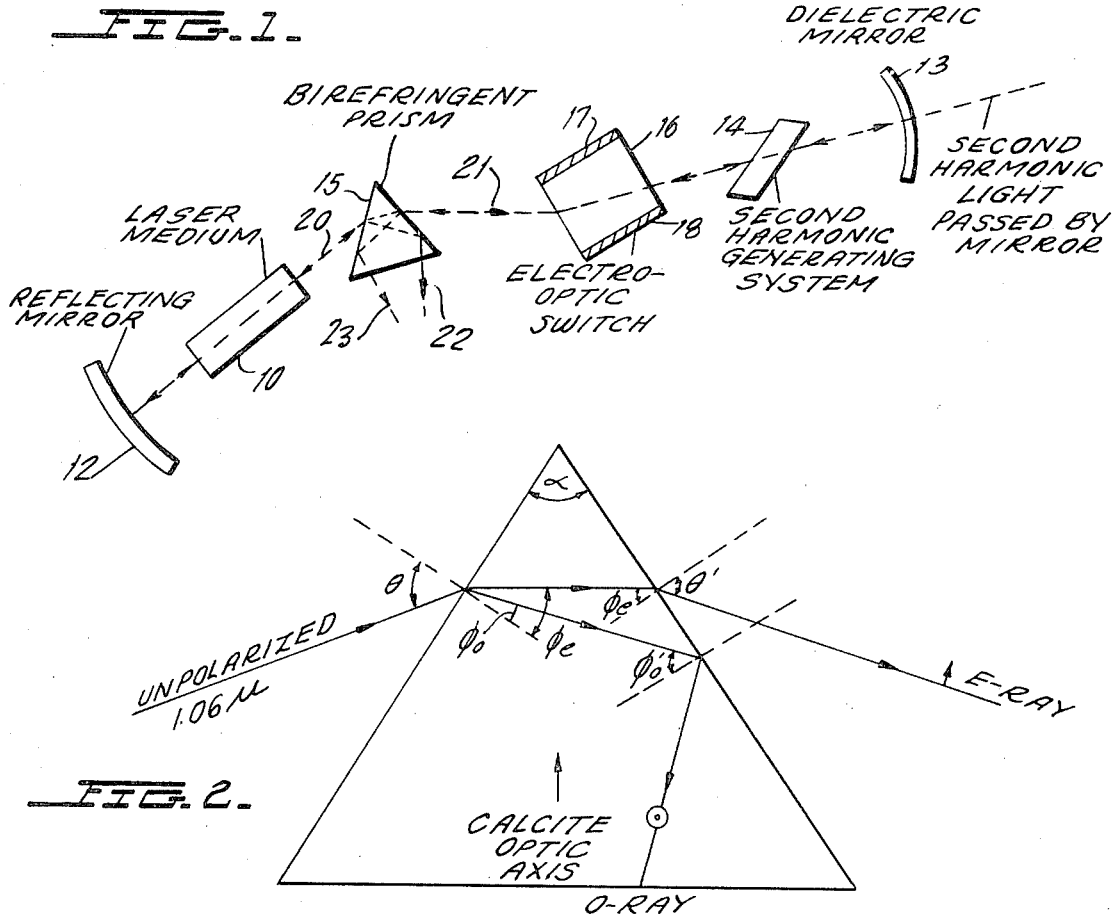
Fig. 1.
Fig. 2.
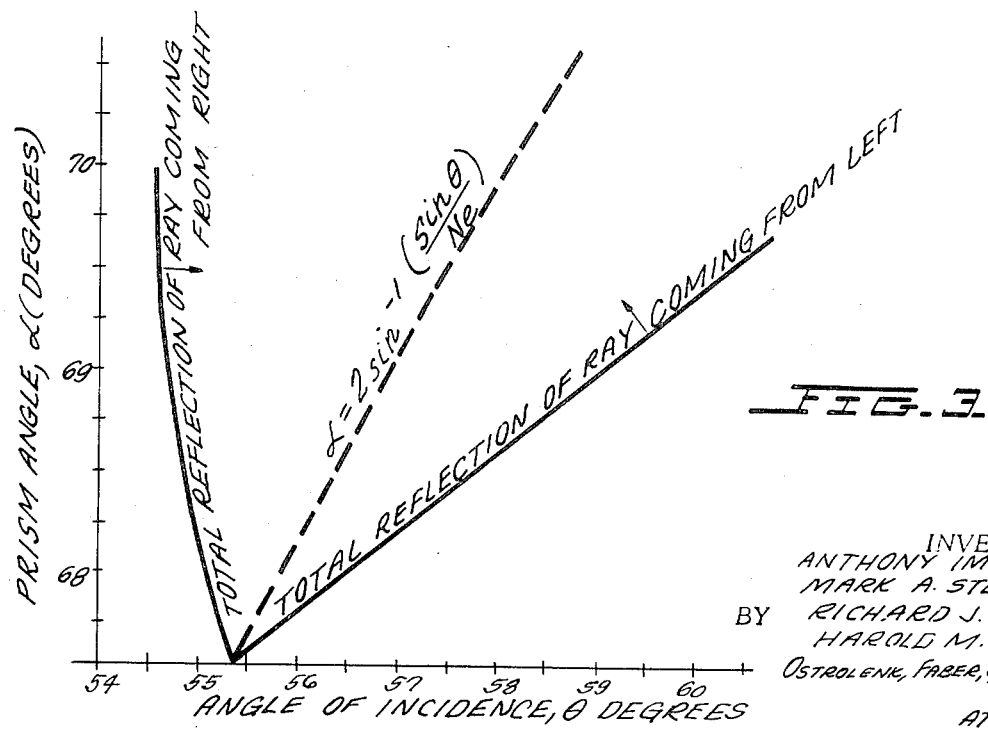
Fig. 3.
INVENTORS
ANTHONY IMMARCO
MARK A. STEINHACKER
RICHARD J. PROEBSTL
HAROLD M. STAHL
BY OSTROLENK, FABER, GERB & SOFFEN
ATTORNEYS

3,564,450
ELECTRO-OPTIC Q-SWITCH USING BREWSTER ANGLE CUT POCKELS CELL
Anthony Immarco, Elmhurst, Mark A. Steinhacker, New York, Richard J. Proebstl, Ridgewood, and Harold M. Stahl, Flushing, N.Y., assignors to Kollsman Instrument Corporation, Syosset, N.Y., a corporation of New York
Filed Oct. 11, 1967, Ser. No. 674,577
Int. Cl. G02f 1/26; H01s 3/00
U.S. Cl. 331—94.5          5 Claims

ABSTRACT OF THE DISCLOSURE

An electro-optic switch for high intensity light and useful as a superior Q-switch for the production of giant laser pulses. The switch includes a birefringent polarizing prism which totally internally reflects one component of unpolarized light and passes the other component toward a Brewster-angle cut Pockels cell. The Brewster-angle cut cell, when charged, circularly polarizes linear light passed by the polarizing prism, and subsequently linearly polarizes the circularly polarized light on its return pass through the cell with the returned light being totally reflected by the prism. When uncharged, the Pockels cell preserves the original polarization of light from the prism with this light passing back through the prism. No anti-reflection coatings are used in the system. A second prism can be added to operate the switch in a half-wave mode.

This invention relates to an electro-optic light switching device, and more particularly relates to a novel device for switching light of extremely high intensity which uses a birefringent polarizing prism which passes a linearly polarized light component from a source toward a Pockels cell with incident light on all interfaces being at or near the Brewster angle to eliminate the need for anti-reflection coatings and transparent electrodes and to minimize surface reflection losses. The switch has particular application to a Q-switched laser for the production of giant laser pulses with increased efficiency and with intensities high enough to destroy presently available anti-reflection coatings.

Q-switched lasers are well known for the production of high intensity laser pulses and are described in the text, "Introduction to Laser Physics" by B. A. Lengyel, published by Wiley, New York, 1966. Such devices require a polarizer in the optical cavity for efficient second harmonic generation, as described in the text, "Nonlinear Optics" by N. Bloembergen, published by W. A. Benjamin, New York 1965.

The most commonly used polarizers for this purpose are Brewster-angle plates or prisms similar to the well-known Nicol-type prism.

Brewster-angle plates have the advantage of Brewster-angle incidence so there is no attenuation of the transmitted component whose polarization is in the plane of incidence. However, they do not attenuate the polarization of the unwanted polarization component below the laser threshold so they cannot satisfactorily contribute to good switching action.

Nicol-type prisms are excellent polarizers since they totally reflect the undesired polarization component. However, unless the prism is coated with an anti-reflection coating, they will attenuate the transmitted polarization component. The ability of coatings to withstand high intensities depends on the material on which they are deposited. Calcite, used in such prisms, may be coated to withstand $10^8$ watts/cm.$^2$ at present, but coatings on other materials such as used in Pockels cells, can withstand less.

The Q-switch described here may be used in a laser to produce pulse intensities greater than $10^{10}$ watts/cm.$^2$, with pulse energies in excess of one joule.

In accordance with the present invention, a novel polarizing prism is arranged to employ total internal reflection of unwanted polarization components, while all transmitted light components through the light switch are incident thereon at or near the Brewster angle, to eliminate the need for anti-reflection coatings.

The electro-optic element of the switch is then formed of a Pockels cell, where again, incident light through the cell is incident at or near the Brewster angle to eliminate the need for anti-reflection coatings on the cell surfaces.

When the novel combination is used in a laser cavity and the Pockels cell is charged, the light passing through the Pockels cell will be first circularly polarized, and when reflected back through the cell, will be linearly polarized in a direction perpendicular to the original polarization. Thus, the prism will totally reflect the return component out of the cavity to inhibit lasing action. When the Pockels cell is unchanged, however, the cell preserves the original polarization with the fundamental component of the light reflecting back to the lasing medium to stimulate further lasing action. A dielectric mirror which reflects light back toward the cell can pass the second harmonic of the light out of the cavity.

Accordingly, a primary object of this invention is to provide a novel light switch for high intensity light which does not require anti-reflection coatings.

Another object of this invention is to provide a novel light switch using a polarizer and electro-optic cell in which light is incident on all interfaces at or near the Brewster angle.

A further object of this invention is to provide an electro-optic Q-switch for a laser cavity which results in higher efficiency and permits increased pulse intensity.

These and other objects of the invention will become readily apparent after reading the following description of the accompanying drawings in which:

FIG. 1 schematically illustrates a laser constructed in accordance with the invention.

FIG. 2 shows the prism of FIG. 1.

FIG. 3 shows a design curve for the prism of FIG. 2.

Figure 4:
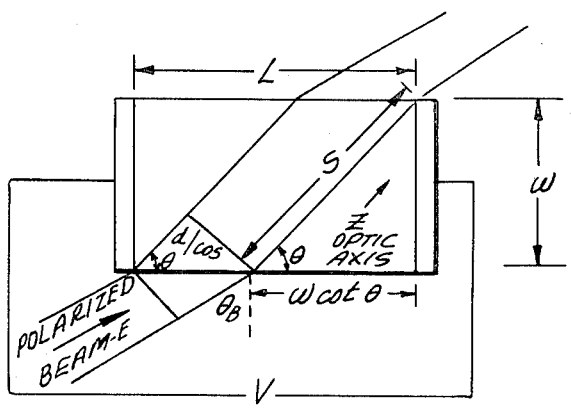
FIG. 4 shows the Pockels cell or phase retarder of FIG. 1.

Referring first to FIG. 1, the novel invention is schematically shown as including a laser medium 10 which may be a circular cylindrical rod of neodymium-doped yttrium aluminum garnet (Nd:YAG) several millimeters in radius and several inches long, or other solid, liquid or gaseous medium, and which is suitably pumped by a flashlamp or other means of excitation, and which is not shown in FIG. 1.

The medium 10 is contained in an optical cavity formed between totally reflecting mirror 12, and a dichloric mirror 13 which passes second harmonic radiation which, in the present embodiment, is at about 5,300 angstroms, and is produced in second harmonic generating crystal 14 which may be a non-centrosymmetric, birefringent crystal, such as potassium dihydrogen phosphate (KDP), or other non-linear optical medium.

In accordance with the invention, a novel Q-switch is contained within the cavity which is comprised of a birefringent prism 15 and electro-optical switch 16 which are arranged so that light within the cavity is incident on their surfaces at, or near, the Brewster-angle, thereby eliminating the need for anti-reflection coatings. The prism 15 and switch 16 will be described in detail later.

In operation, and assuming that electro-optic switch 16 is discharged in that no voltage is applied to its electrodes 17 and 18, the beam of light 20, shown in dotted lines, coming from medium 10 is incident on the left-hand surface of prism 15 at or near the Brewster-angle. The prism will then transmit one polarization component 21 but totally reflects the orthogonal polarization 22 out of the cavity.

Polarization component 21 is preserved as it passes through electro-optic switch 16 when the switch 16 is discharged, and with light incident on the left-hand face of element 16 at or near the Brewster-angle. The passed linear polarization component then passes through crystal 14 which results in production of 5,300 angstrom radiation which is passed by mirror 13. The laser fundamental which is at 10,600 angstroms, however, is reflected by mirror 13 to return to medium 10 to stimulate further lasing action. Note that in the return path, the light is again incident at or near the Brewster-angle on the surfaces of switch 16 and prism 15.

When the switch 16 is charged, or a suitable voltage is applied to electrodes 17 and 18, and as will be later shown, lasing action is prevented, since light initially passing through switch 16 will be circularly polarized. This circularly polarized light will be reflected by mirror 13, back through switch 16 where it is again linearly polarized, but rotated by 90° from the initial plane. Prism 15 then acts as an analyzing prism to produce the totally reflected beam 23.

Thus, with the novel arrangement of the invention, giant laser pulses can be produced by the switching action of switch 16, with incident light falling on the various surfaces at or near the Brewster-angle to do away with anti-reflection coatings.

The following description shows one particular prism which can be satisfactorily used for prism 15, with reference made to FIG. 2. FIG. 2 shows a prism of calcite, although other materials exhibiting birefringence could be used.

In FIG. 2, the optic axis of the calcite is in the plane of the paper. With this choice, the polarization component which is transmitted unattenuated at Brewster incidence will be the extraordinary ray (or E-ray), which has its polarization in the plane of the paper, and which has index of refraction $N_e$. The ordinary ray (O-ray) with polarization perpendicular to the plane of the paper, has index $N_o$.

Calcite has been chosen because of its high birefringence and good transmission. At $1.06\mu$, $N_o=1.641$ and $N_e=1.479$.

When the beam is incident from the left at Brewster-angle $\theta_B$ given by:

$$\theta_B = \tan^{-1} N_e = 55.9° \quad (1)$$

the E-ray is unattenuated, and its angle of refraction is the complement of $\theta_B$, i.e.:

$$\phi_e = 34.1° \quad (2)$$

Thus, for the E-ray to be unattenuated at the second interface, the following relation must exist:

$$\phi_e' = 34.1° = \alpha - \phi_e \quad (3)$$

Thus, for no attenuation of the E-ray:

$$\alpha = 2\phi_e = 68.2° \quad (4)$$

For this prism angle and Brewster incidence, and using Snell's Law:

$$\phi_o' = \alpha - \phi_o = 37.9°$$

which exceeds the critical angle for total internal reflection of the O-ray:

$$\phi_c' = \sin^{-1} \frac{1}{N_o} = 37.5° \quad (5)$$

At this critical angle, the angle of incidence, for $\alpha=68.2°$, is $\theta=56.9°$. Any angle of incidence greater than 56.9° will permit some of the unwanted O-ray to be transmitted by the prism. On the other hand, too small an angle of incidence will result in an O-ray incident from the right at angle $\theta'$, to be partially transmitted by the prism.

In FIG. 3, the permissible values of the angle of incidence are shown as a function of the prism angle. For values of $\theta$ and $\alpha$ to the right of both of these curves, an O-ray incident from the left will not undergo total internal reflection.

For values to the left of the curves, an O-ray incident from the right will not be totally internally reflected. The green ray produced by the laser beam passing through the doubling crystal 14 of FIG. 1 from right to left and through switch 16 when discharged, will also be totally reflected internally in the calcite prism 15, since its polarization is perpendicular to the polarization of the fundamental beam producing it. The index of refraction of calcite for this green O-ray is 1.661 and is even higher than for the fundamental O-ray. Hence by Eq. 5, it is totally reflected within the calcite tat angles which are even smaller than for the $1.06\mu$ O-ray.

The dashed curve in FIG. 3 shows the values of $\alpha$ and $\theta$ for which the E-ray enters and leaves the prism symmetrically. The equation of the curve is:

$$\alpha = 2 \sin^{-1}\left(\frac{\sin \theta}{N_e}\right) \quad (6)$$

When the ray traverses the prism symmetrically, the deviation of the ray is a minimum. This fact may be used to align the prism with respect to the beam.

The transmission coefficient for intensity of the E-ray through both interfaces of the prism is given by:

$$T = \left[1 - \frac{\tan^2 (\theta-\phi_e)}{\tan^2 (\theta+\phi_e)}\right]\left[1 - \frac{\tan^2 (\theta'-\phi_e')}{\tan^2 (\theta'+\phi_e')}\right] \quad (7)$$

and is relatively insensitive to changes in the angle of incidence near the Brewster-angle. This follows from the fact that tangent is very large near 90°, and the quantities $(\theta+\phi_e)$ and $(\theta'+\phi_e')$ will both be close to 90°. Even for so large a change as 5° in $\theta$, Eq. 7 yields an attenuation of the E-ray of only .005.

Therefore, $\alpha$ may be increased slightly above the value of Eq. 4. Using a larger prism angle, it can be seen from FIG. 3 that greater allowance is gained for misalignment, variations in indices of refraction, and beam divergences.

A prism angle of 69°, from FIG. 3, yields a ±2° acceptance angle. For easy alignment, the transmitted beam should pass symmetrically through the prism, which, from FIG. 3, calls for an angle of incidence of 56.9°. At this prism angle and angle of incidence, transmission will be 99.98%.

Turning now to the novel arrangement of the switch 16, which operates in the manner of the well known Pockels cell, the body is formed of KDP, or some suitable material which exhibits the Pockel effect. In accordance with the invention, however, and as contrasted to the use of such cells in the past, the faces of the cell are cut at or near the Brewster angle.

It can be shown mathematically that it is possible to produce circularly polarized light using a linear retarder, such as a Pockels cell, even though the parallel faces are cut so that the polarized light is incident at the Brewster angle, rather than normally. For the latter case, with the light travelling along the optic axis, the crystal axes are each oriented at 45° to the incident polarization and a 90° phase shift is introduced between the field components polarized along the crystal axes. At Brewster incidence, however, to compensate for the inequality of the transmission coefficients at each interface, the phase shift must be greater than 90°. It can also be shown that for two passes through the cell, the polarization will emerge linearly polarized, with the polarization perpendicular to its initial direction. Experimental results verify the foregoing.

Thus, such a Brewster-cut Pockels cell 16 is suitable for use as a laser Q-switch, in conjunction with the prism 15 which serves as a polarizer. Moreover, no anti-reflection coating is needed with these devices.

In the design of such a cell, the following relation should be followed, reference being made to FIG. 4.

For a wave travelling along the optic axis, $\delta$, the phase retardation between the optical E-field components along the induced crystal axes is given by:

$$\delta = KE_z S \tag{8}$$

where $E_z$ is the applied electric field along the optic axis, $S$ is the path length along $z$, and $K$ is a constant, depending on the material.

In FIG. 4

$$E_z = \left(\frac{V}{L}\right) \cos \theta \tag{9}$$

and $$S = w/\sin \theta \tag{10}$$

Since the laser beam is incident at the Brewster angle, $\theta_B$, the angle of refraction of the beam will be the complement of $\theta_B$. Hence $\theta = \theta_B$.

Thus, Eq. 8 becomes:

$$= K \frac{V}{L} w \cos \theta_B \tag{11}$$

From FIG. 4, $$L - \frac{d}{\cos \theta_B} = w \cos \theta_B \tag{12}$$

so Eq. 11 becomes $$= KV \left(1 - \frac{d}{L \cos \theta_B}\right) \tag{13}$$

A trigonometric identity gives:

$$\frac{1}{\cos^2 \theta_B} = \tan^2 \theta_B + 1 \tag{14}$$

At the Brewster angle, $\tan \theta_B = N_o$, the ordinary index of refraction.

Thus, $$\frac{1}{\cos \theta_B} = \sqrt[+]{N_o^2 + 1} \tag{15}$$

where the positive sign is chosen since $0 < \theta < 90°$.

Eq. 13 then becomes:

$$= KV \left(1 - \frac{d\sqrt{N_o^2 + 1}}{L}\right) \tag{16}$$

and Eq. 12 becomes:

$$w = N_{oL} \left(1 - \frac{d\sqrt{N_o^2 + 1}}{L}\right) \tag{17}$$

To determine the retardation required, it can be shown that:

$$|\delta| = 2 \tan^{-1} \frac{N_o^2 + 1}{2} \tag{18}$$

For KDP at $\lambda = 1.06\mu$, $N_o = 1.5$, hence:

$$\theta_B = \tan^{-1} N_o = 56.3° \tag{19}$$

$$\delta = 117° \tag{20}$$

and $$w = 1.5L \left(1 - 1.8 \frac{d}{L}\right) \tag{21}$$

Furthermore, $$K_{KDP} = 1.25 \times 10^{-2} \text{ deg./volt.} \tag{22}$$

Hence $$V_{KDP} = \frac{9.3 \times 10^3}{1 - 1.8 \frac{d}{L}} \tag{23}$$

volts is required across the Pockels electrodes. This voltage may be reduced to about 40% by the use of deuterated KDP ($KD^*P$).

Figure 5:
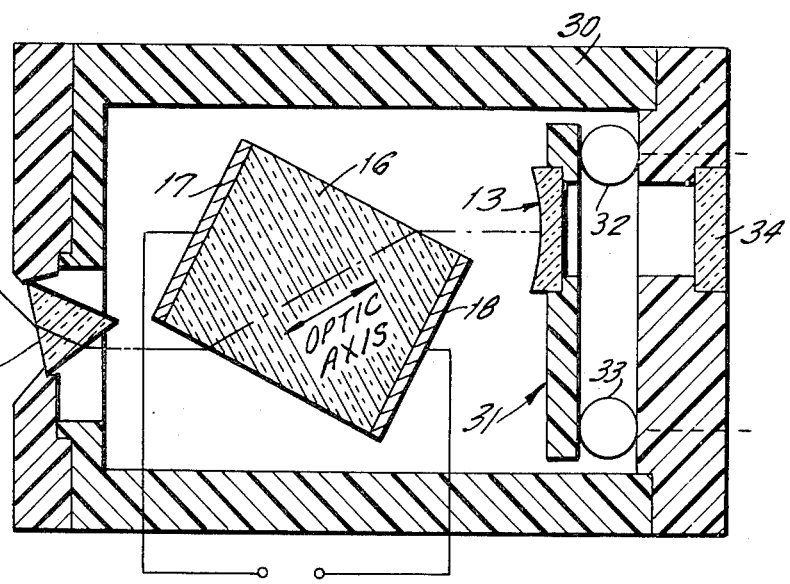
FIG. 5 shows a subassembly of the Q-switch of the invention for quarter-wave operation.

FIG. 5 shows a subassembly of the prism 15 and switch 16 which can be assembled in a laser cavity along with the mirror 13. The mirror 13 is mounted within housing 30 and on a support plate 31. Support plate 31 is, in turn, adjustably mounted by means of schematically shown adjustment supports 32 and 33 which can be adjusted externally of housing 30 to adjust the angular and axial position of mirror 13. Any suitable support (not shown) can be provided for KDP crystal 16. An output window 34 then provides an exit for the output beam of light, and, with prism 15, hermetically seals the interior of housing 30.

Figure 6:
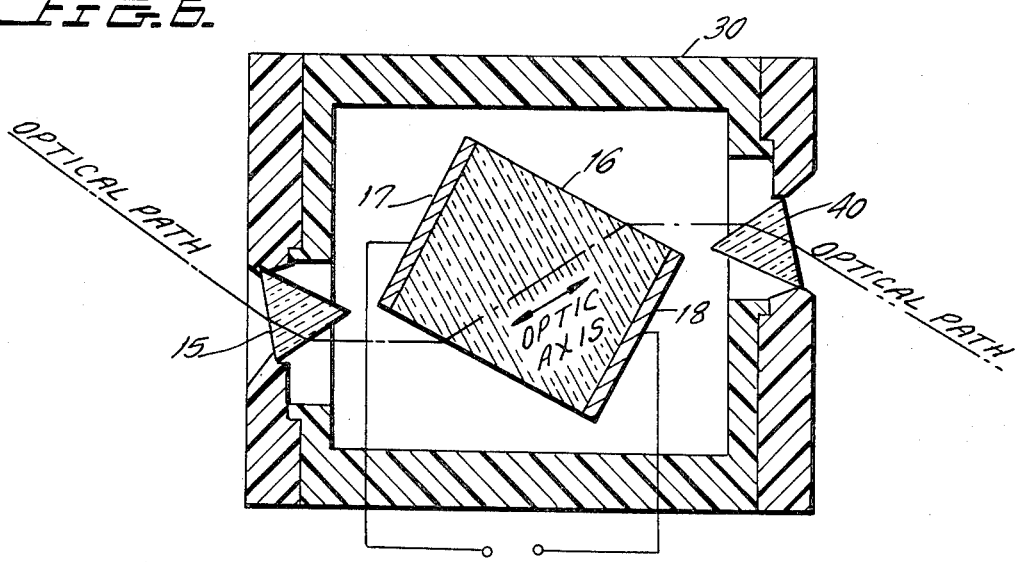
FIG. 6 shows a subassembly of the Q-switch of the invention for half-wave operation.

FIG. 6 shows an arrangement of the switch of the invention for operation in a half-wave mode, as contrasted to the quarter-wave mode of FIG. 5. Thus, in FIG. 6, where components similar to those of FIG. 5 have similar identifying numerals, mirror 13 is removed, and would be externally mounted (not shown), while a second prism 40, which is identical to prism 15, is added in the system.

For half-wave operation, the second prism acts as an analyzing prism, totally reflecting the beam when switch 16 is charged. The phase charge introduced by the switch must be twice that for quarter-wave operation, hence twice the voltage is required for half-wave operation as for quarter-wave operation.

The embodiments of the invention in which an exclusive privilege or property is claimed are defined as follows:

1. A Q-switched laser comprising an optical cavity having a pair of mirrors and including therebetween a laser medium for emitting a laser beam having first and second components, and a Q-switch, all aligned along an optical axis to sustain laser oscillations, said Q-switch including a birefringent prism intercepting said beam to transmit said first component substantially unattenuated and to totally internally reflect said second component, and a phase retarder cell intercepting said first component transmitted by said prism for controllably modifying said first component, said prism having first and second incident light transmitting surfaces lying in inclined planes defining an angle $\alpha$ and said prism having an optic axis parallel to a plane perpendicular to said surfaces to provide separate angles of refraction for each of said components, said first surface facing said medium and being inclined with respect to the optical axis to define an angle of incidence $\theta$ near Brewster's angle of incidence with respect to said first component, the angle $\alpha$ having a value that determines an internal incidence angle of said first component with respect to said second surface near Brewster's angle of incidence, that determines an internal incidence angle of said second component at or greater than the critical angle for total internal reflection thereof, and that determines an internal incidence angle of said first component, upon modification by said cell, with respect to said first surface at or greater than the critical angle for total internal reflection thereof.

2. A Q-switch as defined in claim 1 wherein the angle $\alpha$ satisfies the relation:

$$\alpha = 2 \sin^{-1}\left(\frac{\sin \theta}{N_e}\right)$$

where $N_e$ is the refractive index of said prism with respect to the first of said components.

3. A Q-switch as defined in claim 1 wherein said optic axis is perpendicular to the direction of travel of said first component.

4. A Q-switch as defined in claim 2 wherein said optic axis is equally angularly disposed with respect to each of said surfaces.

5. A Q-switch as defined in claim 1, wherein said prism comprises calcite, said optic axis being equally angularly disposed with respect to each of said surfaces, the angle $\alpha$ satisfies the relation:

$$\alpha = 2\sin^{-1}\left(\frac{\sin\theta}{N_e}\right)$$

where $N_e$ is the refractive index of said prism with respect to the first of said components, and wherein said cell comprises a KDP crystal having an optic axis and having a pair of parallel incident light transmitting surfaces, said surfaces being inclined with respect to said optic axis to determine a light path through said cell parallel to said optic axis upon incidence of said first component on the cell near Brewster's angle of incidence.

References Cited

UNITED STATES PATENTS

| | | | |
|---|---|---|---|
| 3,406,354 | 10/1968 | Dumanchin | 331—94.5 |
| 3,409,819 | 11/1968 | Soffer | 331—94.5 |
| 3,417,345 | 12/1968 | Cabezas et al. | 331—94.5 |
| 3,435,370 | 3/1969 | Harris et al. | 331—94.5 |

OTHER REFERENCES

Hook, W. R. et al.: "Laser Cavity Dumping Using Time Variable Reflection," Applied Physics Letters, vol. 9, No. 3, Aug. 1, 1966, pp. 125–127.

RONALD L. WIBERT, Primary Examiner

T. MAJOR, Assistant Examiner

U.S. Cl. X.R.

350—150, 160